(12) United States Patent
Yoshimoto

(10) Patent No.: US 7,190,645 B2
(45) Date of Patent: Mar. 13, 2007

(54) TILT CONTROL FOR OPTICAL DISK AND TILT CONTROL METHOD

(75) Inventor: Tadafumi Yoshimoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 797 days.

(21) Appl. No.: 10/361,031

(22) Filed: Feb. 10, 2003

(65) Prior Publication Data

US 2003/0161232 A1   Aug. 28, 2003

(30) Foreign Application Priority Data

Feb. 25, 2002   (JP)   ............................ P2002-047316

(51) Int. Cl.
*G11B 7/095*   (2006.01)
(52) U.S. Cl. ............................ 369/44.32; 369/53.19; 369/44.37
(58) Field of Classification Search ............ 369/44.32, 369/44.34, 44.37, 44.41, 53.19, 112.05
See application file for complete search history.

(56) References Cited

U.S. PATENT DOCUMENTS 6,392,967 B1 *   5/2002   Nakayama et al.   ...... 369/44.34
6,594,206 B2 *   7/2003   Katayama   ................. 369/44.32
6,625,093 B1 *   9/2003   Hong et al.   ............... 369/44.32
6,754,146 B2 *   6/2004   Ma et al.   .................. 369/44.41
6,781,930 B2 *   8/2004   Fukumoto   ................ 369/44.32

FOREIGN PATENT DOCUMENTS

JP   2000-36125   2/2000
JP   2001-266381   9/2001

* cited by examiner

*Primary Examiner*—Andrea Wellington
*Assistant Examiner*—Kim-Kwok Chu
(74) *Attorney, Agent, or Firm*—Morgan, Lewis & Bockius LLP

(57) ABSTRACT

At the initialization, a tilt mechanism 9 is activated in a state where an optical pick-up 3 is fixed, and set up at a position where an E-F phase difference obtained in a signal processing portion 4 is 180°. Thereafter, a reproducing operation is started. During the reproducing operation, the tilt mechanism 9 is not activated and the focus control is made with the focus servo by moving the optical pick-up 3 up or down, while the level of a focus error signal is within a certain range. Further, if the level of focus error signal is beyond the certain range because the optical disk 1 is greatly inclined, the tilt mechanism 9 is activated to cause the optical disk 1 to come closer to the optical pick-up 3 to enable the control of the focus servo.

8 Claims, 5 Drawing Sheets

TILT CONTROL FOR OPTICAL DISK AND TILT CONTROL METHOD

BACKGROUND OF THE INVENTION

The present invention relates to a tilt control device for correcting the inclination of an optical disk in the DVD player or the like and a tilt control method.

The DVD player or CD player is provided with an optical pick-up for reading the information recorded on the optical disk by applying a light beam onto the optical disk. If the optical disk is inclined due to plane deflection or warp, the light beam from the optical pick-up is applied obliquely onto the optical disk, and a reflected light is also obliquely directed to the optical pick-up. As a result, the optical pick-up can not receive a part of the reflected light to reproduce a signal correctly. Particularly, the DVD player having a high recording density of disk and a small diameter of light beam is greatly affected by the inclination of disk, so that a correct reproduced signal can not be obtained even with a slight inclination. Thus, to eliminate this nonconformity, it is conventionally commonly practiced that a swingable tilt mechanism is provided to correct the inclination of disk.

FIG. 7 is a schematic diagram showing the tilt control device in the conventional DVD player. 11 denotes an optical disk such as DVD or CD, 12 denotes an optical pick-up for reading the information recorded on the optical disk by applying a light beam onto the optical disk 11, 13 denotes a tilt sensor for optically sensing the inclination of the optical disk 11, 14 denotes a tilt control portion for controlling a tilt motor 15 on the basis of a sensed output of the tilt sensor 13, and 16 denotes a tilt mechanism that is activated by the tilt motor 15. If the optical disk 11 is inclined, the tilt sensor 13 senses the amount of inclination (tilt amount) to send a sensed signal to the tilt control portion 14. The tilt control portion 14 drives the tilt motor 15 on the basis of the sensed signal, so that the tilt mechanism 16 is swung at a predetermined angle by the tilt motor 15. As a result, the optical disk 11 has its attitude corrected in response to swinging of the tilt mechanism 16 to correct the inclination of optical disk so that an illuminating light from the optical pick-up 12 is incident vertically upon the optical disk 11.

However, in the conventional tilt control device, the tilt sensor 13 is provided, apart from the optical pick-up 12, to detect the amount of inclination of the optical disk 11, whereby a separate component of the tilt sensor 13 is needed and there is a drawback that the cost is increased. Further, since the optical pick-up 12 and the tilt sensor 13 are unmatched in position, an error occurs in detecting the amount of inclination, resulting in a problem that the tilt control may not be correctly made.

Thus, noting that without the use of the tilt sensor, the light beam is unfocused on the optical disk if the disk is inclined, a tilt control device for making the tilt control was offered in which an electric current for driving a focus actuator in the optical pick-up is detected, and the amount of inclination of the optical disk is detected based on this electric current (the Unexamined Japanese Patent Application Publication No. 2000-36125). However, in a servo control IC, because a drive current of the focus actuator is not usually monitored, it is difficult to take out this current on the circuit, whereby the IC with a signal terminal of drive current must be developed separately to take out this current. Further, in the tilt control device as disclosed in the above patent, there is a need for a circuit that converts current into voltage, resulting in a complex circuit configuration. Moreover, to make the tilt operation by detecting correctly the amount of inclination of the optical disk, while reproducing the optical disk, it is required to set up a reference position of the tilt prior to reproducing the optical disk. However, no description of this point is made in the above patent.

Another method that uses no tilt sensor is conceived in which a difference signal from a light receiving element of the optical pick-up is employed. For example, a phase difference between two signals obtained from the light receiving element divided into four is detected, a pulse having a time width directly proportional to this phase difference is generated, and the tilt amount is detected on the basis of a sum of pulse widths, as described in the Unexamined Japanese Patent Application Publication No. 2001-266381. However, in this case, a pulse width detecting circuit and an arithmetical operation circuit must be newly added, resulting in a problem that the circuit configuration and the signal processing are more complex.

SUMMARY OF THE INVENTION

The present invention is achieved in the light of the above-mentioned problems, and it is an object of the invention to provide a tilt control device that can be simply realized without greatly changing a circuit and set up a reference position of tilt correctly.

A tilt control device according to the present invention detects the inclination of the optical disk using an E-F phase difference to set up the reference position of tilt at the initialization. The E-F phase difference is a phase difference between two signals obtained from the reflected lights of two sub-beams, and when the optical disk is in a vertical state to an optical axis of the optical pick-up, the E-F phase difference is 180°. Thus, at the initialization, the tilt mechanism is activated in a fixed state of the optical pick-up to set up the tilt mechanism at a position where the E-F phase difference of 180°. Thereafter, the reproducing operation is started. During the reproducing operation, the tilt mechanism is not activated and the focus control is made with the focus servo by moving the optical pick-up up or down, while the inclination of the optical disk is within a certain range. Further, if the inclination of the optical pick-up is beyond the certain range, the tilt mechanism is activated to cause the optical disk to come closer to the optical pick-up to enable the focus servo. The inclination of the optical disk during the reproducing operation can be detected on the basis of the level of focus error signal or the E-F phase difference.

In this manner, the inclination of the optical disk can be detected precisely from the E-F phase difference. Thus, at the initialization, the position where the E-F phase difference is 180° is searched and made the reference position of tilt, whereby it is possible to set up the reference position correctly. Since no existing circuit is employed to detect the E-F phase difference, no new circuit is needed and the signal processing is simplified.

In this invention, at the initialization, the optical pick-up is moved to the outer peripheral side of the optical disk, whereby the reference position of tilt is set up. In this manner, the reference position is set up on the outer peripheral side of the disk with more amount of displacement in the vertical direction due to inclination, and can be set up more correctly than on the inner peripheral side where the amount of displacement is small.

Further, in this invention, at the initialization, the reference position of tilt is set up in the state where the optical pick-up is fixed at the intermediate position in the vertical movement range. In this manner, even if the optical disk is displaced up or down from the reference position in reproduction, the optical pick-up can be moved up or down, following the optical disk, whereby the stable focus servo operation is made.

DETAILED DESCRIPTION OF THE PREFERRED EMBODIMENTS

Figure 1:
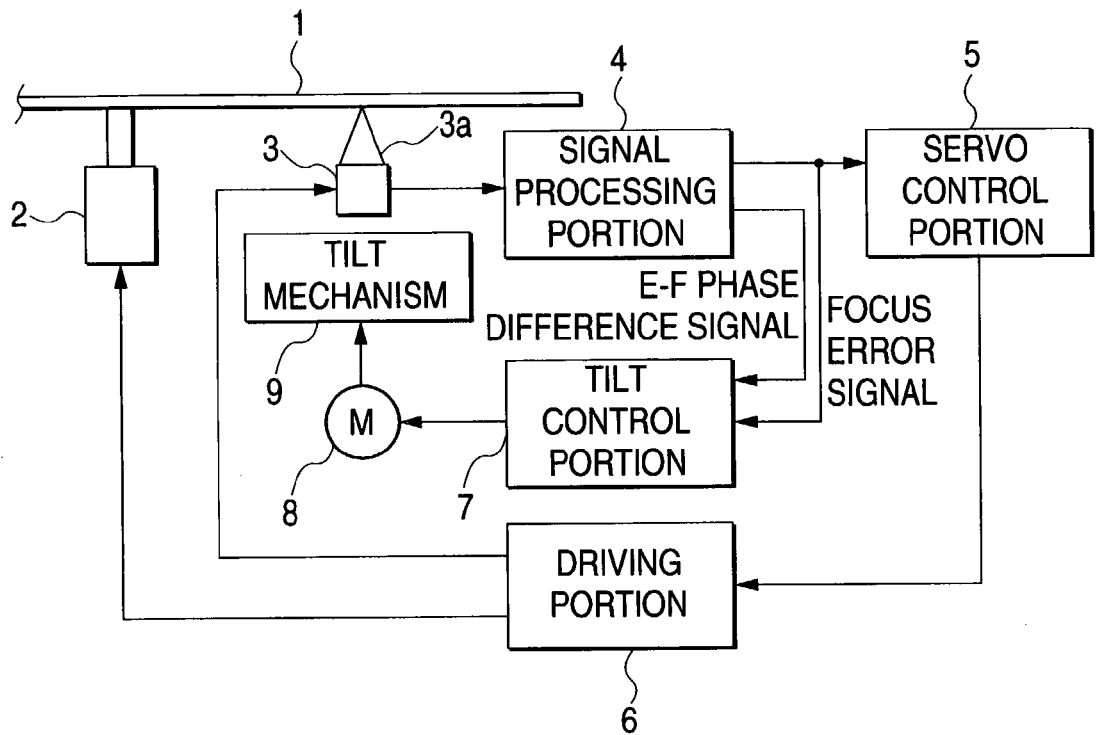
FIG. 1 is a block diagram of a tilt control device according to the present invention.

FIG. 1 is a block diagram of a tilt control device according to an embodiment of the present invention. In FIG. 1, 1 denotes an optical disk such as DVD or CD, 2 denotes a disk motor for rotating the optical disk 1, 3 denotes an optical pick-up of three beam system for reading the information recorded on the optical disk by applying a light beam 3a composed of a main beam and two sub-beams onto the optical disk 1, 4 denotes a signal processing portion for outputting an E-F phase difference signal or a focus error signal on the basis of a light received output of the optical pick-up 3, 5 denotes a servo control portion for controlling the operation of a focus servo on the basis of a signal from the signal processing portion 4, and 6 denotes a driving portion for driving the disk motor 2 and the optical pick-up 3 by receiving a signal from the servo control portion 5. 7 denotes a tilt control portion for correcting the inclination of the optical disk 1 on the basis of the E-F phase difference signal and the focus error signal by receiving those signals from the signal processing portion 4, 8 denotes a tilt motor that is driven on the basis of an output signal from the tilt control portion 7, and 9 denotes a tilt mechanism that is swung by rotation of the tilt motor 8 to adjust the inclination of the optical disk 1.

Figure 2:
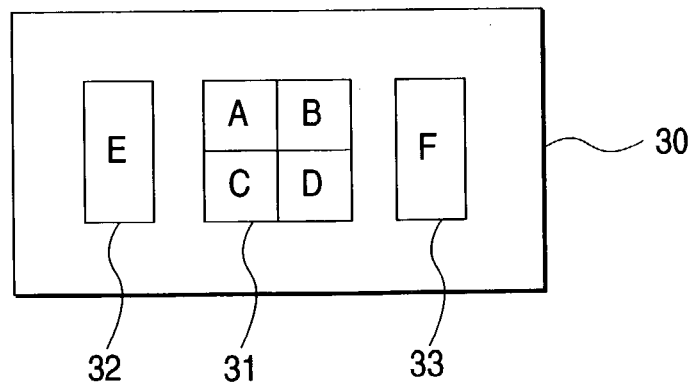
FIG. 2 is a view showing a light receiving portion in an optical pick-up.
Figure 3:
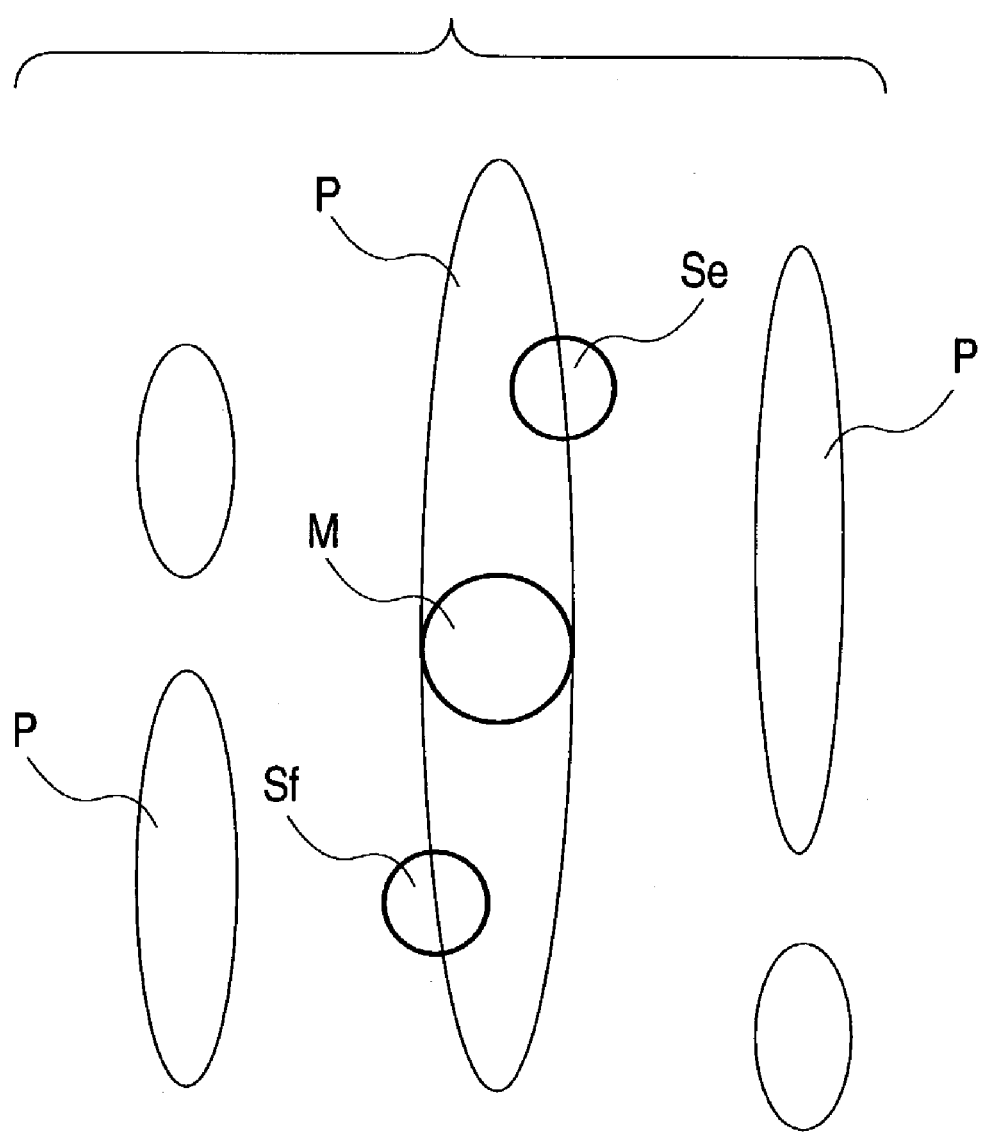
FIG. 3 is a view showing a beam spot condensed on an optical disk.

FIG. 2 is a view showing a light receiving portion in the optical pick-up 3. FIG. 3 is a view showing a beam spot condensed on the optical disk 1. In FIG. 2, the light receiving portion 30 comprises a four divided light receiving section 31 for receiving reflected light of the main beam M of FIG. 3, and the light receiving sections 32 and 33 for receiving reflected light of two sub-beams Se and Sf, respectively. P in FIG. 3 is a pit formed on a track of the optical disk 1.

When the optical disk 1 is in a vertical state to the light beam, namely, the optical disk is not inclined, a phase difference between a signal (E signal) obtained from the light receiving section 32 corresponding to the sub-beam Se and a signal (F signal) obtained from the light receiving section 33 corresponding to the sub-beam Sf, or the E-F phase difference, is equal to 180°. As the optical disk 1 is inclined with respect to the light beam, the E-F phase difference is deviated from 180°. A phase difference detecting circuit for detecting this phase difference to output an E-F phase difference signal is provided in the signal processing portion 4.

Figure 4:
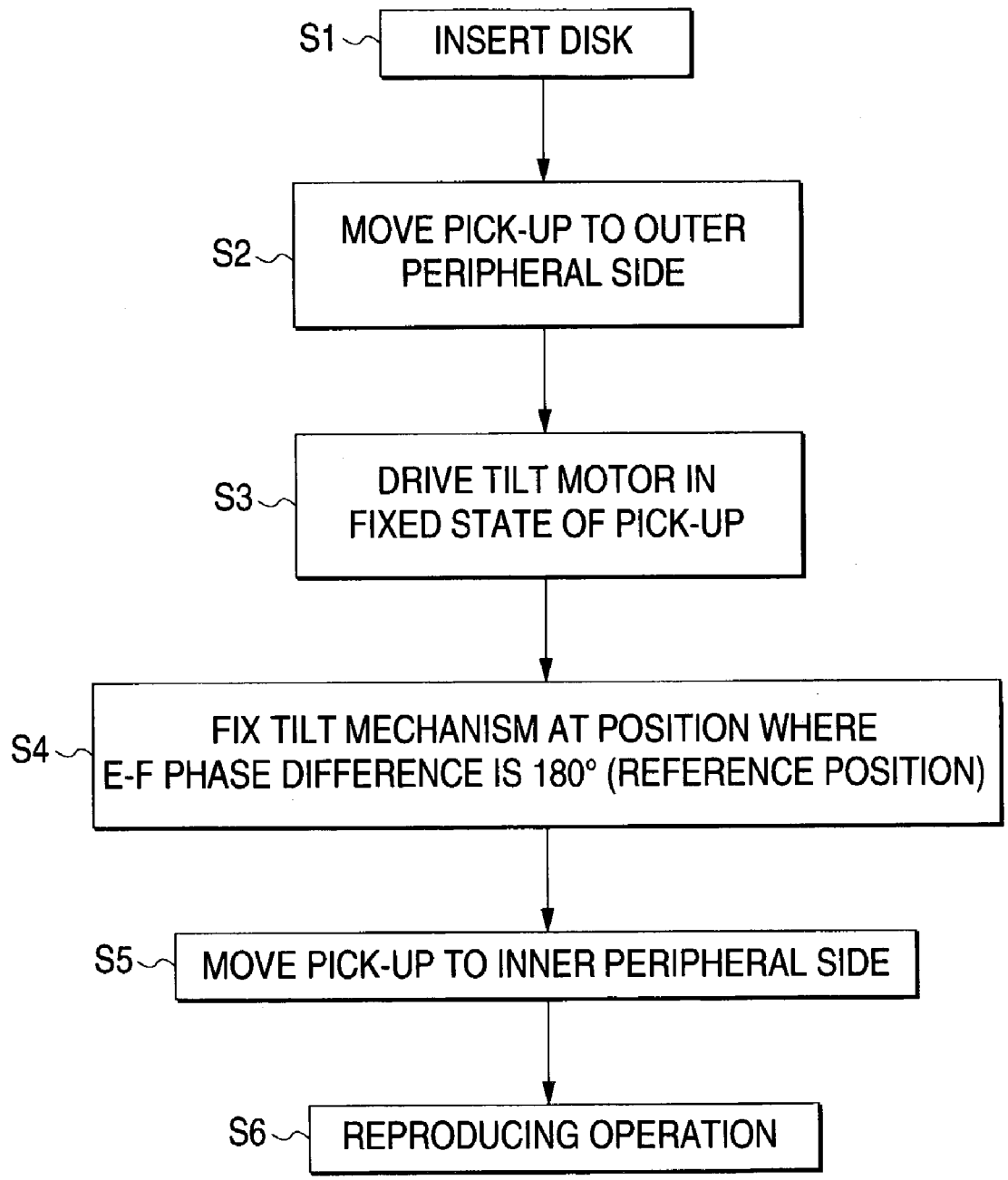
FIG. 4 is a flowchart showing the operation of the device of FIG. 1.

The operation of the tilt control device of FIG. 1 will be described below. FIG. 4 is a flowchart showing a procedure for a series of operations. At first, the optical disk 1 is inserted into a disk insertion slot (not shown) of the disk player (step S1). If the optical disk 1 is inserted, the initialization is made at steps S2 to S4. Then, the procedure goes to steps S5 and S6 to start the normal reproducing operation. The operation of each of steps S2 to S6 is controlled by a system controller, not shown in FIG. 1.

Figure 5A:
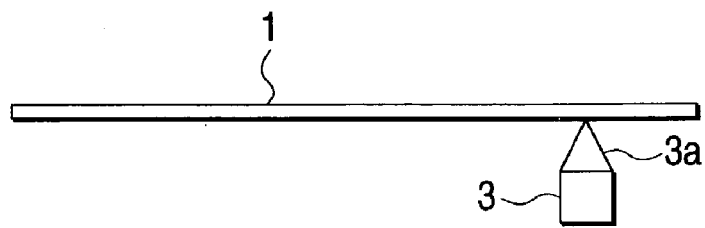
FIGS. 5A to 5D are views for explaining the tilt operation.

First of all, the operation at the initialization will be described below. If the optical disk 1 is inserted, the optical pick-up 3 is moved to the outer peripheral side (right side in FIG. 1) of the optical disk 1, and stopped near the outer periphery (step S2). At this position, the optical pick-up 3 is placed in a fixed state without vertical movement, and the tilt motor 8 is driven by the tilt control portion 7 (step S3). If the tilt motor 8 is operated, the tilt mechanism 9 linked with the motor is swung, and the amount of inclination of the optical disk 1 is changed correspondingly. In this state, if a light beam 3a is applied from the optical pick-up 3 onto the optical disk 1, the E-F phase difference is varied in accordance with the amount of inclination of the optical disk 1. Thus, the position where the E-F phase difference is 180° is detected by the tilt control portion 7 on the basis of an E-F phase difference signal obtained by the phase difference detecting circuit in the signal processing portion 4. At this position, the tilt motor 8 is stopped to fix the tilt mechanism 9 (step S4). The E-F phase difference of 180° means that the optical disk 1 is in vertical state to the optical axis of the optical pick-up 3, whereby the positional relation between the optical pick-up 3 and the optical disk 1 is set optimally at this position. Thus, this position is defined as a reference position of tilt. FIG. 5A is a view showing the positional relation between the optical disk 1 and the optical pick-up 3 at the reference position. After the reference position of tilt is set up in this way, the optical pick-up 3 is moved to the inner peripheral side (left side in FIG. 1) of the optical disk 1 (step S5), and the normal reproducing operation is performed (step S6).

Figure 5B:
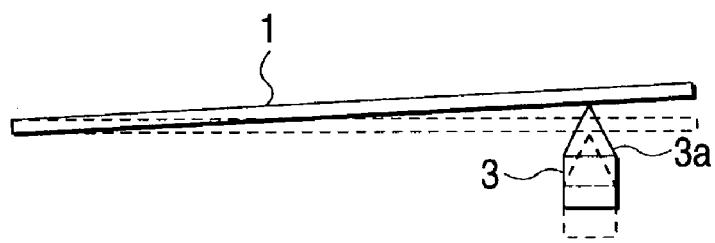

The tilt control in the reproducing operation at step S6 will be described below. The tilt control portion 7 always monitors the level of focus error signal during the reproducing operation. The tilt mechanism 9 is not activated even if the optical disk 1 is inclined, while the level is within a certain range, whereby the ordinary focus servo control is made. That is, if the optical disk 1 is inclined as shown in FIG. 5B, a focus error signal at a level corresponding to the amount of inclination is output from the signal processing portion 4. However, in the case of FIG. 5B, because the amount of inclination of the disk is small and the level of focus error signal is low, the tilt control portion 7 does not drive the tilt motor 8 to activate the tilt mechanism 9. In this case, the servo control portion 5 drives the optical pick-up 3 via the driving portion 6 vertically in accordance with the focus error signal, and makes the adjustment so that the focus error signal is minimized. Accordingly, even if the tilt mechanism 9 is not activated, the optical pick-up 3 can follow the inclination of the optical disk 1 owing to the focus servo.

Figure 5C:
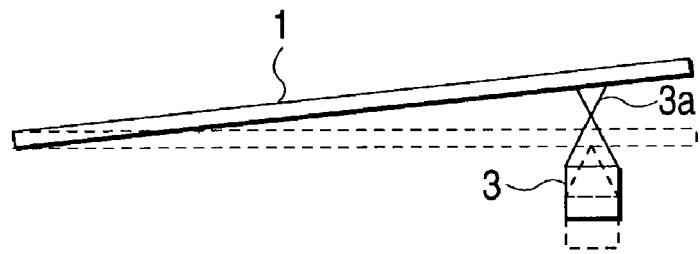

On the other hand, if the level of focus error signal goes beyond the certain range, the tilt mechanism 9 is operated to correct the inclination of the optical disk 1. That is, since the optical pick-up 3 has a limited vertical movement range, if the optical disk 1 is greatly inclined due to vibration or shock as shown in FIG. 5C, the optical pick-up 3 can not follow the inclination of the optical disk to disable the control of the focus servo. In this case, the tilt control portion 7 controls the tilt motor 8 to swing the tilt mechanism 9 to cancel the inclination of the optical disk 1.

Figure 8:
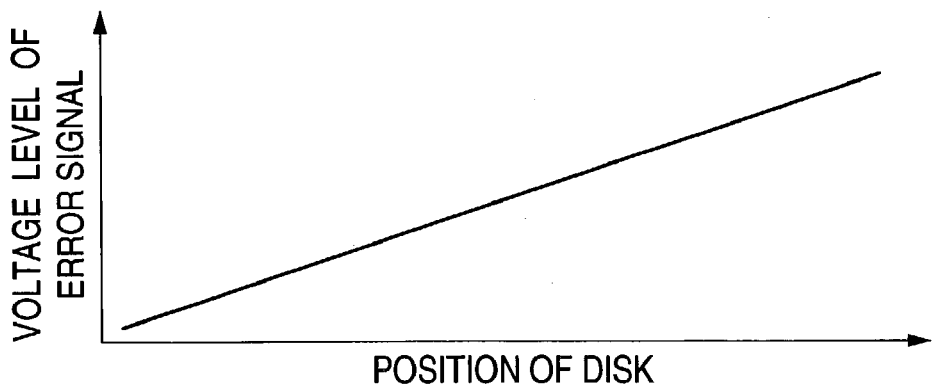
FIG. 8 is a diagram showing a relation between voltage level of error signal and position of a disk.

If a disk is inclined, phase difference between two sub-beam is displaced from 180°, and the displacement is detected as a voltage signal. If CPU detects that the voltage signal reaches a predetermined value, CPU sends a signal to a tilt motor 8 in order to cancel an inclination of the disk, and a tilt mechanism 9 is swung. FIG. 8 is a diagram showing a relation between voltage level of error signal and position of a disk.

Figure 5D:
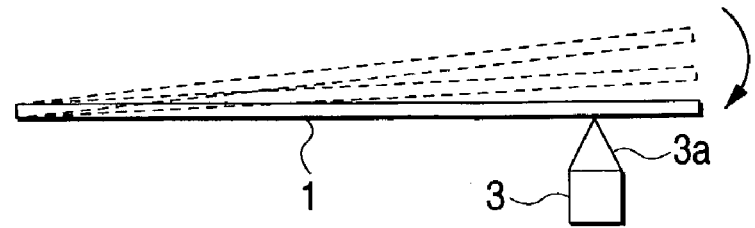

As a result, the optical disk 1 is displaced in a direction closer to the optical pick-up 3, as shown in FIG. 5D. If the optical disk 1 is displaced to a range where the focus servo of the servo control portion 5 is operative, the optical pick-up 3 can follow the inclination of the optical disk 1 due to the focus servo in the same manner as in FIG. 5B.

In the embodiment as above described, the E-F phase difference signal and the focus error signal are employed, instead of the tilt sensor, as detecting means for detecting the inclination of the optical disk, whereby the tilt sensor is dispensed with and the cost is lowered. At the initialization, the reference position of tilt can be set up at high precision in accordance with the E-F phase difference, making it possible to detect the inclination at the optical disk 1 from the reference position correctly during the reproducing operation. Therefore, if the level of focus error signal has a certain threshold set up in reproduction, the tilt mechanism 9 is activated to enable the tilt operation to be made reliably, when the optical disk 1 is inclined beyond a certain amount to cause the level of the focus error signal to exceed the threshold. Further, a circuit for detecting the E-F phase difference is conventionally provided to detect a tracking error, and the E-F phase difference signal can be taken out from the circuit, whereby the circuit configuration of the signal processing portion 4 does not become complex. Furthermore, it is only necessary to detect a phase difference of 180° without making an intricate arithmetical operation process, resulting in the very simple signal processing.

In the above embodiment, at the initialization, the optical pick-up 3 is moved to the outer peripheral side of the optical disk 1, whereby the reference position of tilt is set up near the outer periphery. Since the optical disk has a larger amount of vertical displacement due to inclination on the outer peripheral side than the inner peripheral side, the reference position is set up near the outer periphery with larger amount of displacement more accurately than on the inner peripheral side with smaller amount of displacement.

Figure 6:
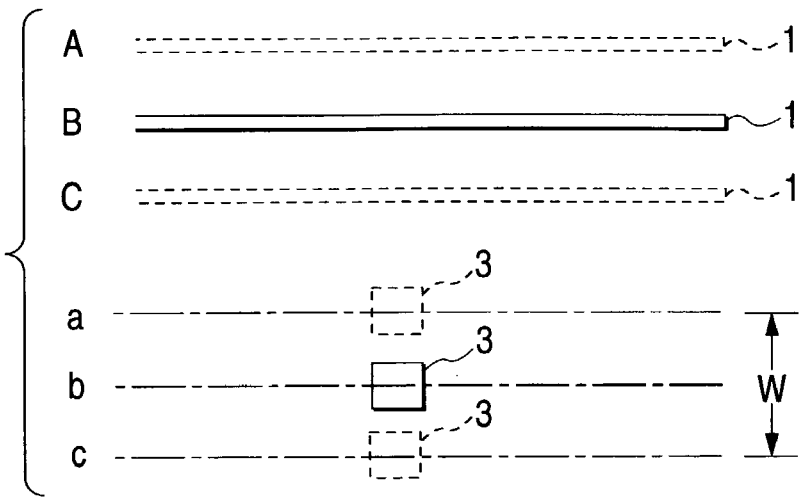
FIG. 6 is a view for explaining a movement range of the optical pick-up.

When the optical pick-up 3 is placed in a fixed state in setting the reference position, it is preferable that the optical pick-up 3 is fixed at an intermediate position in the vertical movement range. That is, the optical pick-up 3 is moved up or down in a vertical movement range W, following the displacement of the optical disk 1, as shown in FIG. 6. However, if a reference position A is set up in a state where the optical pick-up 3 is fixed at an upper limit position a, the optical pick-up 3 can not be displaced above the upper limit position a, when the optical disk 1 is displaced above the reference position A. Further, if a reference position C is set up in a state where the optical pick-up 3 is fixed at a lower limit position c, the optical pick-up 3 can not be displaced under the lower limit position c, when the optical disk 1 is displaced under the reference position C. Thus, if a reference position B is set up in a state where the optical pick-up 3 is fixed at the intermediate position b in the vertical movement range W, the optical pick-up 3 is displaced above or under the reference position B to follow the optical disk, when the optical disk 1 is displaced above or under the reference position B, whereby the stable focus servo operation can be obtained.

In the above embodiment, the inclination of the optical disk is detected on the basis of the level of focus error signal during the reproducing operation. However, employing the E-F phase difference signal, instead of the focus error signal, the inclination of the optical disk may be detected on the basis of a deviation of the E-F phase difference from 180°.

Further, in the above embodiment, after the optical disk 1 is displaced to the focus servo range by the tilt operation, the optical pick-up 3 is caused to follow the optical disk 1 owing to the focus servo. However, the optical disk 1 may be displaced by the tilt operation alone till the E-F phase difference becomes 180°.

Further, in the above embodiment, the tilt motor 8 is employed as the driving means for driving the tilt mechanism 9, but other driving means than the motor may be employed.

With this invention, at the initialization, the reference position of tilt is set up by detecting the inclination of disk on the basis of the E-F phase difference, whereby the tilt control can be simply implemented without greatly changing or adding the circuit. Since the reference position can be set up precisely on the basis of the phase difference, the tilt operation can be effected reliably by detecting the inclination of disk during the reproducing operation.

Figure 7:
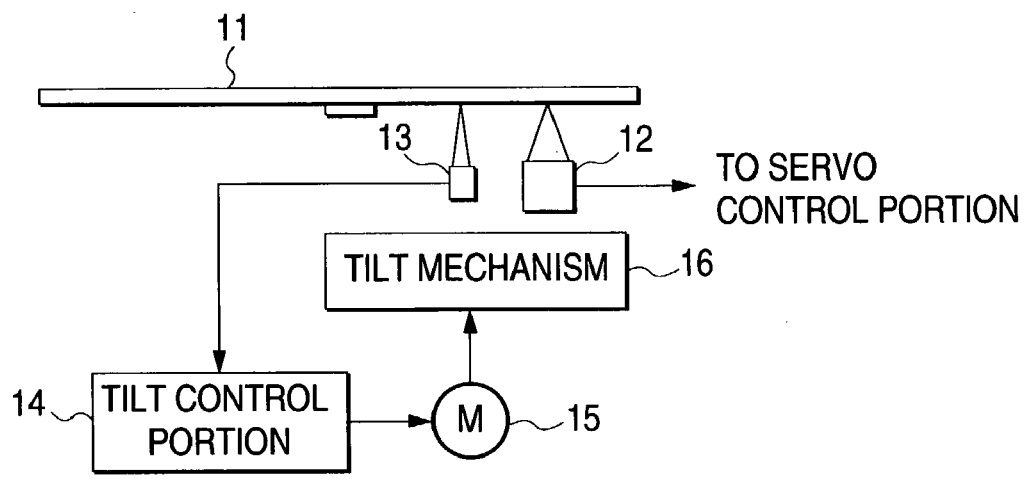
FIG. 7 is a schematic diagram of the conventional tilt control device.

[FIG. 1]
4: Signal processing portion
5: Servo control portion
6: Driving portion
7: Tilt control portion
9: Tilt mechanism
A: E-F phase difference signal
B: Focus error signal
[FIG. 4]
S1: Insert a disk.
S2: Move a pick-up to outer peripheral side.
S3: Drive a tilt motor in a fixed state of the pick-up.
S4: Fix a tilt mechanism at a position where the E-F phase difference is 180° (reference position).
S5: Move the pick-up to inner peripheral side.
S6: Reproducing operation
[FIG. 7]
14: Tilt control portion
16: Tilt mechanism
A: To servo control portion
[FIG. 8]
A: Voltage level of error signal
B: Position of disk

What is claimed is:

1. A tilt control device for an optical disk comprising:
an optical pick-up for reading the information recorded on the optical disk by applying a light beam consisting of a main beam and two sub-beams onto the optical disk,
a tilt mechanism for correcting an inclination of the optical disk,
a tilt motor for activating said tilt mechanism,
detecting means for detecting the amount of inclination of the optical disk, and
a tilt control portion for controlling said tilt motor on the basis of the detection result of said detecting means, wherein
said detecting means involves the use of a focus error signal obtained from a reflected light of the main beam and an E-F phase difference signal obtained from the reflected lights of two sub-beams, instead of a tilt sensor;

said detecting means includes two light receiving sections each of which receives the sub-beam and generates the E-F phase difference therebetween;

at the initialization, said tilt mechanism is set up at a position where the E-F phase difference is 180° by driving said tilt motor under the control of said tilt control portion in a state where said optical pick-up is fixed at an intermediate position in a vertical movement range by moving said optical pick-up to the outer peripheral side of the optical disk, and a reproducing operation is started by moving said optical pick-up to the inner peripheral side of the optical disk;

during the reproducing operation, said tilt control portion does not activate said tilt motor, if the level of the focus error signal is within a certain range, and said tilt control portion activates said tilt motor to control the optical disk to come closer to the optical pick-up in a range where the focus servo is possible, if the level of the focus error signal is beyond the certain range.

2. A tilt control device for an optical disk comprising:

an optical pick-up for reading the information recorded on the optical disk by applying a light beam onto the optical disk, a tilt mechanism for correcting an inclination of the optical disk, two light receiving sections each of which receives the sub-beam and generates an E-F phase difference therebetween; and a tilt control portion for controlling said tilt mechanism, wherein at the initialization, said tilt mechanism is set up at a position where the E-F phase difference is 180° by activating said tilt mechanism under the control of said tilt control portion in a state where said optical pick-up is fixed, and a reproducing operation is started;

during the reproducing operation, said tilt control portion does not activate said tilt mechanism, if the inclination of the optical disk is within a certain range, and said tilt control portion activates said tilt mechanism to control the optical disk to come closer to the optical pick-up, if the inclination of the optical disk is beyond the certain range.

3. The tilt control device for optical disk according to claim 2, wherein said optical pick-up is moved to the outer peripheral side of the optical disk at the initialization.

4. The tilt control device for optical disk according to claim 2, wherein said optical pick-up is fixed at an intermediate position in a vertical movement range at the initialization.

5. A tilt control method for an optical disk comprising the steps of:

at the initialization, moving an optical pick-up to the outer peripheral side of the optical disk;

generating an E-F phase difference between two light receiving sections each of which receiving the sub-beam;

setting up a tilt mechanism at a position where the E-F phase difference is 180° by driving a tilt motor under the control of a tilt control portion in a state where said optical pick-up is fixed at an intermediate position in a vertical movement range;

starting a reproducing operation by moving said optical pick-up to the inner peripheral side of the optical disk;

during the reproducing operation, not activating said tilt motor by said tilt control portion, if the level of the focus error signal is within a certain range, and activating said tilt motor by said tilt control portion to control the optical disk to come closer to said optical pick-up in a range where the focus servo is possible, if the level of the focus error signal is beyond the certain range.

6. A tilt control method for an optical disk comprising the steps of:

generating an E-F phase difference between two light receiving sections each of which receiving the sub-beam;

at the initialization, setting up a tilt mechanism at a position where the E-F phase difference is 180° by activating said tilt mechanism under the control of a tilt control portion in a state where an optical pick-up is fixed, starting a reproducing operation;

during the reproducing operation, not activating said tilt mechanism by said tilt control portion, if the inclination of the optical disk is within a certain range, and activating said tilt mechanism by said tilt control portion to control the optical disk to come closer to the optical pick-up, if the inclination of the optical disk is beyond the certain range.

7. The tilt control device for optical disk according to claim 6, further comprising a step of:

moving said optical pick-up to the outer peripheral side of the optical disk at the initialization.

8. The tilt control device for optical disk according to claim 6, further comprising a step of:

fixing said optical pick-up at an intermediate position in a vertical movement range at the initialization.

* * * * *